(12) United States Patent
McNew et al.

(10) Patent No.: US 7,142,873 B2
(45) Date of Patent: *Nov. 28, 2006

(54) SYSTEM AND METHOD FOR CALIBRATION OF A WIRELESS NETWORK

(75) Inventors: Justin Paul McNew, Santa Monica, CA (US); Khaled I. Dessouky, Studio City, CA (US); Jun Liu, Sherman Oaks, CA (US)

(73) Assignee: Technocom Corporation, Encino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/233,247

(22) Filed: Sep. 21, 2005

(65) Prior Publication Data

US 2006/0019674 A1 Jan. 26, 2006

Related U.S. Application Data

(63) Continuation of application No. 10/634,407, filed on Aug. 5, 2003, now Pat. No. 6,993,318.

(60) Provisional application No. 60/401,164, filed on Aug. 5, 2002.

(51) Int. Cl.
*H04Q 7/20* (2006.01)

(52) U.S. Cl. .................. 455/456.1; 455/456.6; 455/423; 455/456.5; 340/539.13

(58) Field of Classification Search .. 455/404.1–404.2, 455/428, 445–446, 456.1–456.3, 423, 435.1, 455/432.1, 456; 340/357.1, 450, 539.13, 340/426.19, 993; 342/357.1, 450; 701/1, 701/213

See application file for complete search history.

(56) References Cited

U.S. PATENT DOCUMENTS

| | | | |
|---|---|---|---|
| 5,095,503 A * | 3/1992 | Kowalski | 455/563 |
| 5,394,540 A | 2/1995 | Barrington et al. | |
| 5,737,517 A | 4/1998 | Kite et al. | |
| 5,809,108 A | 9/1998 | Thompson et al. | |
| 5,835,565 A | 11/1998 | Smith et al. | |
| 6,014,102 A * | 1/2000 | Mitzlaff et al. | 342/457 |
| 6,169,883 B1 | 1/2001 | Vimpari et al. | |
| 6,272,450 B1 | 8/2001 | Hill et al. | |
| 6,327,350 B1 | 12/2001 | Spangler et al. | |
| 6,336,035 B1 | 1/2002 | Somoza et al. | |
| 6,351,644 B1 | 2/2002 | Hussain et al. | |
| 6,356,763 B1 * | 3/2002 | Kangas et al. | 455/456.1 |
| 6,516,195 B1 | 2/2003 | Zadeh et al. | |
| 6,522,887 B1 * | 2/2003 | Larsson et al. | 455/456.5 |

(Continued)

*Primary Examiner*—Joseph Feild
*Assistant Examiner*—Kamaran Afshar
(74) *Attorney, Agent, or Firm*—Christie, Parker & Hale, LLP.

(57) ABSTRACT

In one embodiment, the present invention is a method and system for calibrating a wireless network including a Mobile Switching Center (MSC), and a Position Determination Device (PDD). The wireless network is capable of determining the position of a handset. The method includes receiving a trigger from the MSC; sending a position request message to the PDD in response to the received trigger; receiving a position request response message from the PDD; continuously sending subsequent position request messages to the PDD in response to the same received trigger, until a termination command is received; terminating the sending subsequent position request messages, when the termination command is received; and generating output data including network calibration parameters.

18 Claims, 9 Drawing Sheets

U.S. PATENT DOCUMENTS

| | | |
|---|---|---|
| 6,577,874 B1 | 6/2003 | Dailey |
| 6,667,963 B1 | 12/2003 | Rantalainen et al. |
| 6,681,099 B1 | 1/2004 | Keranen et al. |
| 6,901,264 B1 * | 5/2005 | Myr ........................ 455/456.5 |
| 6,944,445 B1 * | 9/2005 | Lee ............................ 455/417 |
| 6,993,318 B1 * | 1/2006 | McNew et al. .......... 455/404.2 |
| 2001/0003093 A1 | 6/2001 | Lundin |
| 2001/0053684 A1 * | 12/2001 | Pirila ........................ 455/410 |
| 2002/0022481 A1 * | 2/2002 | Yang .......................... 455/432 |
| 2002/0183075 A1 | 12/2002 | Fauconnier |
| 2002/0193121 A1 | 12/2002 | Nowak et al. |
| 2004/0043773 A1 * | 3/2004 | Lee et al. ................ 455/456.1 |
| 2004/0081139 A1 | 4/2004 | Beckmann et al. |
| 2004/0087315 A1 * | 5/2004 | Dufva et al. ............. 455/456.1 |
| 2004/0203884 A1 | 10/2004 | McCalmont et al. |

* cited by examiner

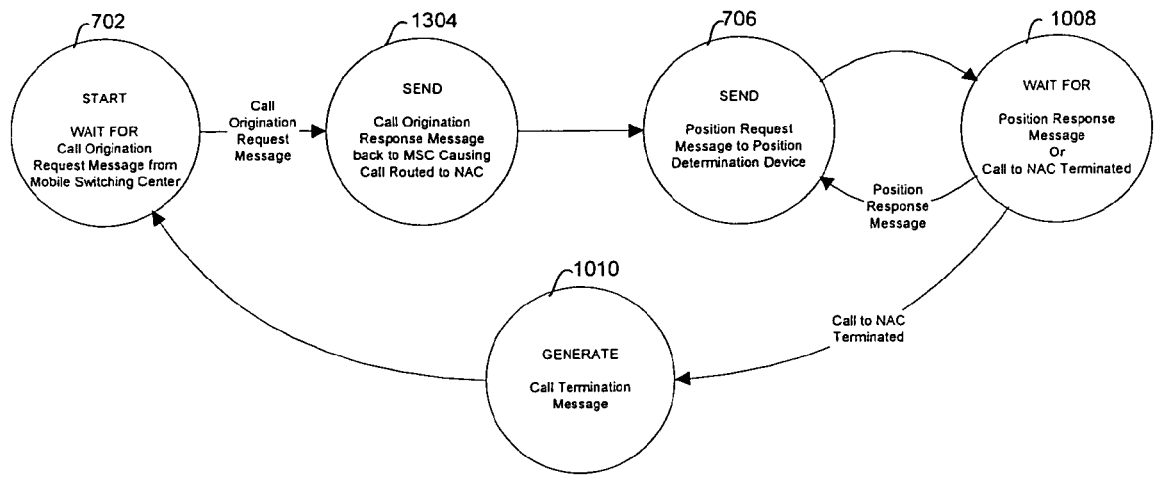

Fig. 13

Log File reference number: 1
Date: 080503
Time: 16:00

Telephone number: (818)555-1111
| Calibration Sample | Sample latitude | Sample longitude | time |
|---|---|---|---|
| 1 | 34 degrees 5.99 North | 118 degrees 12.65 West | 16:01 |
| 2 | 34 degrees 6.01 North | 118 degrees 12.67 West | 16:05 |
| 3 | 34 degrees 6.02 North | 118 degrees 12.69 West | 16:11 |
| 4 | 34 degrees 6.03 North | 118 degrees 12.70 West | 16:16 |
| 5 | 34 degrees 6.04 North | 118 degrees 12.71 West | 16:20 |

Telephone number: (818)555-2222
| Calibration Sample | Sample latitude | Sample longitude | time |
|---|---|---|---|
| 1 | 34 degrees 5.98 North | 118 degrees 12.65 West | 16:02 |
| 2 | 34 degrees 6.02 North | 118 degrees 12.65 West | 16:04 |
| 3 | 34 degrees 6.01 North | 118 degrees 12.66 West | 16:12 |
| 4 | 34 degrees 5.99 North | 118 degrees 12.68 West | 16:17 |
| 5 | 34 degrees 6.00 North | 118 degrees 12.69 West | 16:23 |

FIG. 14

SYSTEM AND METHOD FOR CALIBRATION OF A WIRELESS NETWORK

CROSS-REFERENCE TO RELATED APPLICATION(S)

This application is a continuation of U.S. patent application Ser. No. 10/634,407, filed Aug. 5, 2003 now U.S. Pat. No. 6,993,318, which claims the priority of U.S. Provisional Patent Application No. 60/401,164, filed Aug. 5, 2002. The complete disclosures of which are incorporated herein by reference.

FIELD OF THE INVENTION

The present invention relates to a wireless communication network. More specifically, the present invention relates to a method and apparatus for generating calibration data for positioning determination systems in wireless networks.

BACKGROUND OF THE INVENTION

Wireless networks can determine the position of a mobile device based on trilateration using, for example, time difference measurements taken by the wireless handset, or by components installed in the wireless network or adjunct to it.

The challenge of trilateration on wireless signals, e.g., in PCS and cellular networks, is that those networks have transmitters and/or receivers that are either unsynchronized or loosely synchronized to a timing reference that is of insufficient accuracy to support location via trilateration. This problem can be corrected by calibrating the wireless network and/or Position Determination Device to determine these calibration values and in turn subtract their effects from subsequent position calculations.

Calibrating a network can be an expensive and time-consuming process. In order to achieve statistical significance, many calibration data samples are required. Traditional methods utilize a substantial amount of test equipment to obtain the necessary calibration data. A typical method requires the tester to generate a significant number of calls from a wireless handset. Each call is received by the Mobile Switching Center, which forwards the call to another device that accepts the call and issues one Position Request message per call, generating a single Position Response Only one calibration sample is generated per Position Response, therefore many calls are required to generate a sufficient number of samples. To generate the number of Position Requests required for statistical significance, the tester must make an equal number of calls, which is generally time consuming because the tester has no knowledge of when the Position Response was received by the device that issued the Position Request. The limiting factor is that this traditional method generates only one calibration sample per invocation of the Position Determination process when used for calibration purposes.

A calibration sample is defined herein as a measurement of the difference between an absolute time reference, and the actual time reference being used by the components in the wireless network. Each reference point in a wireless network can be associated with an observed time, and the calibration value associated with that reference point is subtracted from the observed time reference to achieve a reference closer to absolute time. The calibration value is comprised of many calibration samples via averaging or other statistical methods.

SUMMARY OF THE INVENTION

The present invention is a method and system for network assisted calibration (NAC) in a wireless network. The NAC method and system cause a Position Determination Device to rapidly generate wireless network calibration data. This calibration data is generally used to improve the location accuracy of position determination systems that rely on trilateration within cellular networks. When integrated with a wireless intelligent network, the system of the present invention assumes the role of a messaging system and wireless call-taking device (landline voice or data network) during calibration calls that autonomously causes the rapid and efficient generation of calibration data.

In one embodiment, the present invention is a method and system for calibrating a wireless network including a Mobile Switching Center (MSC), and a Position Determination Device (PDD). The PDD within the wireless network is capable of determining the position of a handset. The method includes receiving a phone call from the MSC; sending a first position request message to the PDD responsive to the received phone call; receiving a position request response message from the PDD; continuously sending subsequent position request messages to the PDD corresponding to the same received phone call; terminating the sending of subsequent position request messages, when a termination trigger is received from the MSC; and sending a call termination message to the MSC in response to the received termination trigger.

In another embodiment, the present invention is a method and system for causing generation of calibration data in a wireless network including a Mobile Switching Center (MSC), and a Position Determination Device (PDD) to determine position of a handset. The method includes receiving a trigger from the MSC; sending a position request message to the PDD in response to the received trigger; receiving a position request response message from the PDD; continuously sending subsequent position request messages to the PDD in response to the same received trigger, until a termination command is received; terminating the sending subsequent position request messages, when the termination command is received; and causing the generation of output data for use in network calibration. The trigger may be generated by a call origination message from the MSC or by a received call from the handset. Moreover, the termination command may be a call termination message from the MSC, or the termination may occur when the call origination message from the MSC is released.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

BRIEF DESCRIPTION OF THE DRAWINGS

FIG. 13 is an exemplary state diagram, according to Hybrid embodiment; and

FIG. 14 is an exemplary log file, according to one embodiment of the present invention.

DETAILED DESCRIPTION OF THE INVENTION

Figure 1:
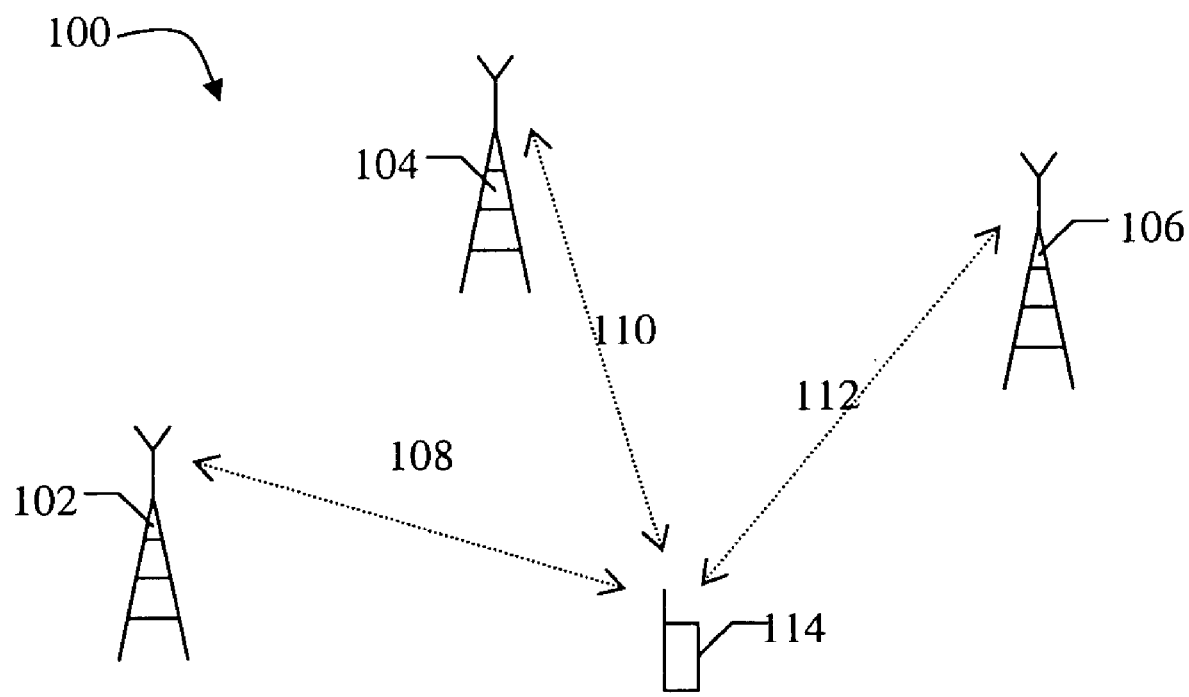
FIG. 1 is an exemplary illustration of position determination in a wireless network.

FIG. 1 illustrates an exemplary position determination configuration 100 in a wireless network. The configuration 100 includes wireless sites (or base stations) 102, 104, 106 with known positions and a wireless handset 114 with an unknown position. Once the time difference measurements 108, 110 and 112 between the wireless sites 102, 104, 106 and the wireless handset 114 are performed, the handset position can be determined by trilateration from known positions of the wireless sites 102, 104, 106. In practice, wireless sites within a location determination system operate according to local timing references. These timing references may not be exactly the same for each wireless site, and the resulting offsets cause some amount of error in the location computation.

Calibration is a process that reduces this position error by comparing the time reference of each wireless site to a common reference to account for the timing differences. The calibration process may utilize the actual measurements used for trilateration and positioning when the location of the wireless handset is already known, because the propagation delay between each wireless site and the handset can be computed based on the respective location of each. By using these measurements to calibrate the location determination system, location accuracy can be significantly improved.

For example, in realization of Phase-2 911 and other location based services, the network elements typically involve one or more of the following generic devices: Mobile Switching Center, Mobile Position Gateway and Position Determination Device. The Mobile Switching Center is responsible for call routing and managing the setup and teardown of voice circuits. The Mobile Position Gateway assists the Mobile Switching Center in determining how to route the call. The Position Determination Device is responsible for calculating the position of the mobile handset.

Figure 2:
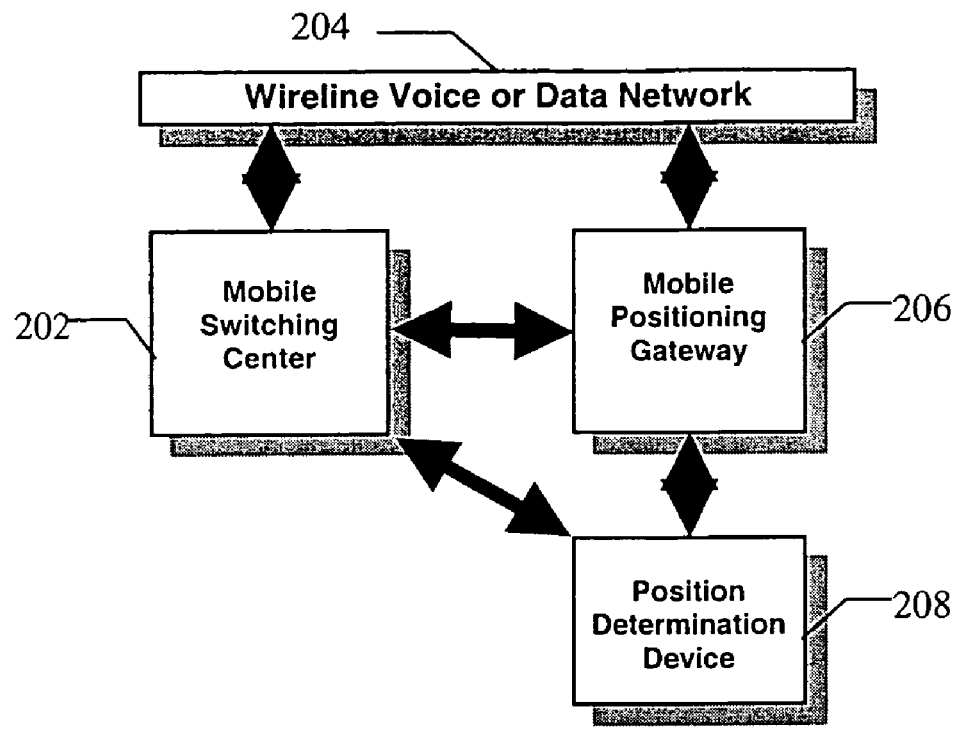
FIG. 2 is an exemplary architecture used to enable location services in a wireless network.

The basic architecture for a wireless network enabled with location capabilities is illustrated in FIG. 2. In this representation, the Mobile Switching Center 202 includes the wireless sites (base stations) connected to it directly or through a base station controller. The primary responsibility of the Mobile Switching Center 202 is routing telephone calls to and from the wireline voice or data network 204. The Mobile Position Gateway 206 manages location information for wireless handsets, and provides an interface for external devices including the wireline network 204 to request position information. The Position Determination Device 208 is responsible for calculating the location of a wireless handset, and communicating the position information to the Mobile Positioning Gateway 206 for management and distribution of the location information. These elements are part of the wireless intelligent network that enables operation of radio and location services, such as, those utilized in cellular telecommunications.

Figure 3:
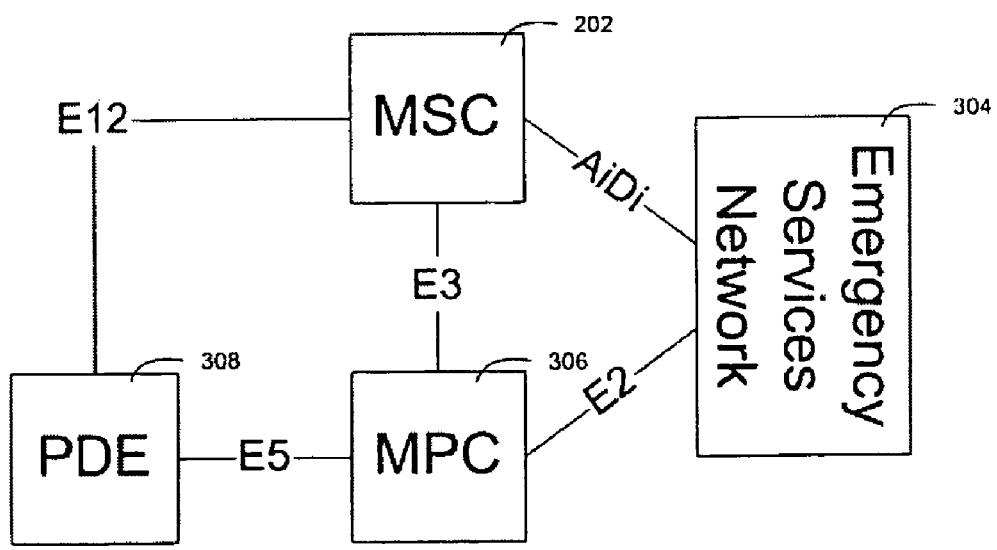
FIG. 3 is a network reference model for a wireless Phase 2 911.

One embodiment of such a wireless network is realized in Wireless Phase-2 911 services, in which emergency callers are located for the entity that receives the emergency call. This architecture is illustrated in FIG. 3. As shown, the Mobile Positioning Center (MPC) 306, and Position Determination Entity (PDE) 308 are respective embodiments of Mobile Positioning Gateway 206, and Position Determination Device 208 of FIG. 2. The Emergency Services Network 304 is one embodiment of the wireline voice and data network 204 (of FIG. 2). In FIG. 3 the AiDi interface is used to carry voice conversations over a "call path" between the MSC and the Emergency Services Network. The E3 interface is used by the MSC to request call path utilization instructions from the MPC using "messaging". The E5 interface is used by the MPC to request position from the PDE, also using messaging. The E12 is a third messaging interface used for communication between the PDE and a handset, which is carried through the MSC. The Emergency Services Network corresponds to a specific application, namely Phase 2 911 services that utilize location to assist emergency callers. When it receives an emergency call on the AiDi interface, it uses messaging on the E2 interface to request position from the MPC. For PSC 1900 or GSM and UMTS networks, the Gateway Mobile Positioning Center and Serving Mobile Location Center act as the Mobile Positioning Gateway 206 and Position Determination Device 208, respectively.

When a call that requires location identification is initiated on a wireless network, such as for Phase-2 911 services, intelligent network messages are exchanged between network devices over signaling interfaces to instantiate call setup procedures. When a call is placed to a facility that requires location capabilities, certain embodiments of these messages are exchanged to request and respond with the calculated location of the wireless handset. The messages of interest in this case are termed generically: Call Origination messages, Call Termination messages, and Position messages. These messages can be of either a Request or Response variety.

Call Origination Request messages are typically exchanged between the Mobile Switching Center 202 and other network devices. They are used to notify other network elements that a call is being setup and to request services to assist in this task. Call Termination messages are exchanged between the Mobile Switching Center 202 and other network devices. They are used to notify other network elements that a call has terminated and resources associated with this call can be released.

Position messages are exchanged between the Mobile Position Gateway 202 and the Position Determination Device 208. They are used to request and respond with the calculated position of a handset. Position messages are also exchanged between the Mobile Position Gateway 206 and the wireline voice and data networks 204 (e.g. an Emergency Services Network 304 in FIG. 3) tasked with retrieving caller location. These messages are also used to request updates of a handset's position.

When the Position Determination Device has been implemented within a wireless network, the wireless network infrastructure and handsets support some form of trilateration, wherein the position of the handset is also determined through another independent process, for example, Global Positioning System (GPS). In one embodiment, in order to trigger the NAC process, a calibration call is placed from a wireless handset to a standard telephone or to the NAC system. The NAC system described herein assumes the responsibility of the Mobile Position Gateway and in certain embodiments the wireline voice or data network for calibration calls. More importantly, the system enables the rapid generation of calibration data as described in the paragraphs that follow.

One of the differences between the present invention and the Mobile Position Gateway is that the present invention enters a "loop" process whereby it autonomously generates multiple position request messages to the Position Determination Device per calibration call. However, for normal calls, the Mobile Position Gateway is only permitted to generate a single position request message per call and does not have any call interface. Another difference between the present invention and the Mobile Position Gateway is that the present invention also acts as a call-taking device. The processes of this call-taking device (as explained later) closely coupled with the NAC's messaging engine effect the rapid generation of data required for calibration.

Figure 4:
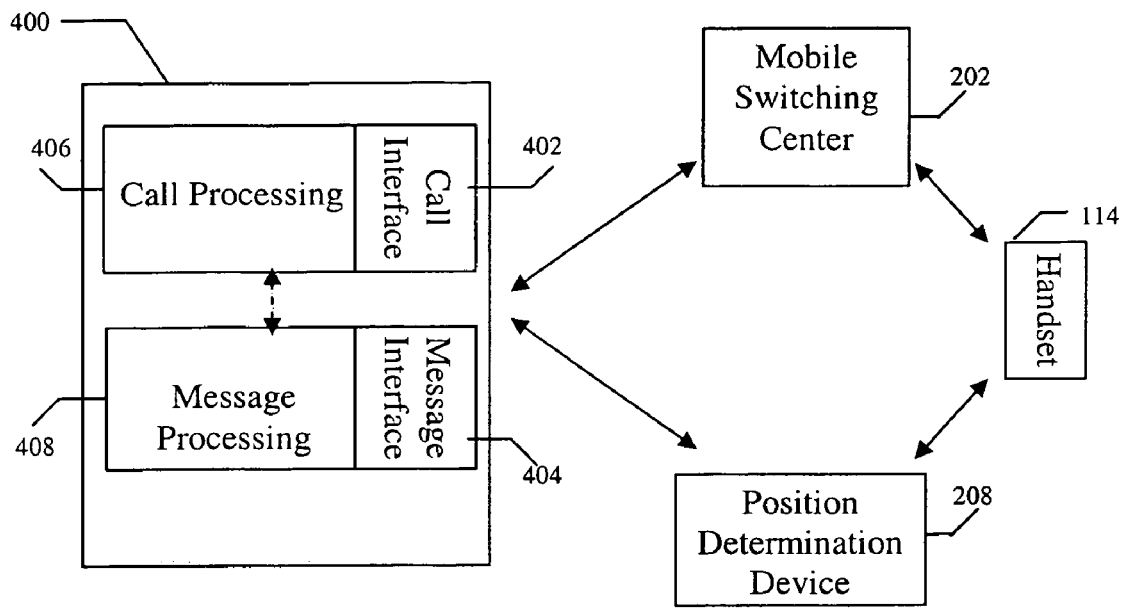
FIG. 4 is an exemplary block diagram of a system for network assisted calibration, according to one embodiment of the present invention.

FIG. 4 is an exemplary block diagram of a NAC system, according to one embodiment of the present invention. As shown, there are two interfaces: the Call Interface 402 used for handling voice or data calls forwarded from the handset 114 through the Mobile Switching Center 202, and the Message Interface 404 used for handling messages to and from the Mobile Switching Center 202 and the Position Determination Device 208. The interface between the Mobile Switching Center 202 or the Position Determination Device 208 and the handset 114 are outside the scope of this embodiment of the NAC system. The NAC system 400 also includes two core elements, the Call Processing engine 406 and the Message Processing engine 408. The Call Processing engine 406 accepts voice or data calls and provides voice or data status information to the handset over the corresponding voice or data interface, for example, synthesized speech or text messages. The Mobile Position Gateway is neither equipped with this capability, nor intended for use in such a manner in a wireless network. The Message Processing engine 408 handles the sending and receiving of Call Origination/Termination Request, Call Origination/Termination Response, Position Request and Position Response messages. The Call Processing and the Message Processing engines may communicate on an internal interface to facilitate the NAC process, for example, to detect that a calibration call has ended. The interface between these engines also makes use of the Call Origination/Termination Request and Response messages.

There are different ways to initiate/terminate the NAC process based on the calibration calls or Message exchanges, including but not limited to:

A Messaging Only Method: With the Messaging Only method, the NAC process is triggered and terminated via the Message Interface 404 by Call Origination/Termination messages from a Mobile Switching Center. The details are described below with reference to FIGS. 5, 6 and 7.

A Call Path Method: With the Call Path method, a calibration call is made directly to the NAC system (forwarded from the Mobile Switching Center). The NAC process is triggered and terminated via the Call Path Interface 402. The details are described below with reference to FIGS. 8, 9 and 10.

A Hybrid Method: With the Hybrid method, the NAC process is triggered via the Message Interface 404 but terminated via the Call Path Interface 402. The details are described below with reference to FIGS. 11, 12 and 13.

After the NAC process is triggered, the NAC system 400 begins sending multiple Position Request messages in rapid sequence to the Position Determination Device 208. After sending a Position Request message to the Position Determination Device, the NAC system waits for a response message. When the system receives a Position Response message, it logs the message and immediately sends another Position Request message. This process may be implemented sequentially using a single calibration call by a single handset. Alternatively, more than one calibration calls made by a plurality of handsets may be processed in parallel. Position Messages are always sent on the Message Interface 404 between the NAC system 400 and the Position Determination Device 208, regardless of the method used to trigger/terminate the process. The processing within the NAC system may be stopped after generation of a sufficient amount of samples. Alternatively, the process may continue indefinitely or until the call is terminated.

The NAC system 400 makes a plurality of Position Determination Requests for each Call Origination Request. The system allows a substantial number of Position Requests to be generated for statistical significance while only requiring the tester to make a single call. This speeds up the process significantly and saves time.

The system also has accurate knowledge of when the Position Determination Device 208 has completed its position computations through having received the Position Response message (the Position Response message is generated by the Position Determination Device 208 when it has completed its position computations), therefore, minimizing the amount of time between subsequent requests. This eliminates significant uncertainty on the part of a tester who is making calibration calls, wherein the tester does not have specific information about the time it takes to make a location fix by the Position Determination Device 208. When the call path interface is utilized during a calibration call the NAC system can provide immediate feedback as to the status of messages via audible mechanisms inherent to the handset 114, for example, synthesized audio.

In one embodiment, the NAC system 400 terminates the Position Request generation process when the calibration call is ended, which overcomes a significant challenge wherein Position Request messages would continue to be generated after a calibration call has ended or the handset is no longer available. The NAC process may also be terminated after a specified number of requests have been made.

Figure 5:
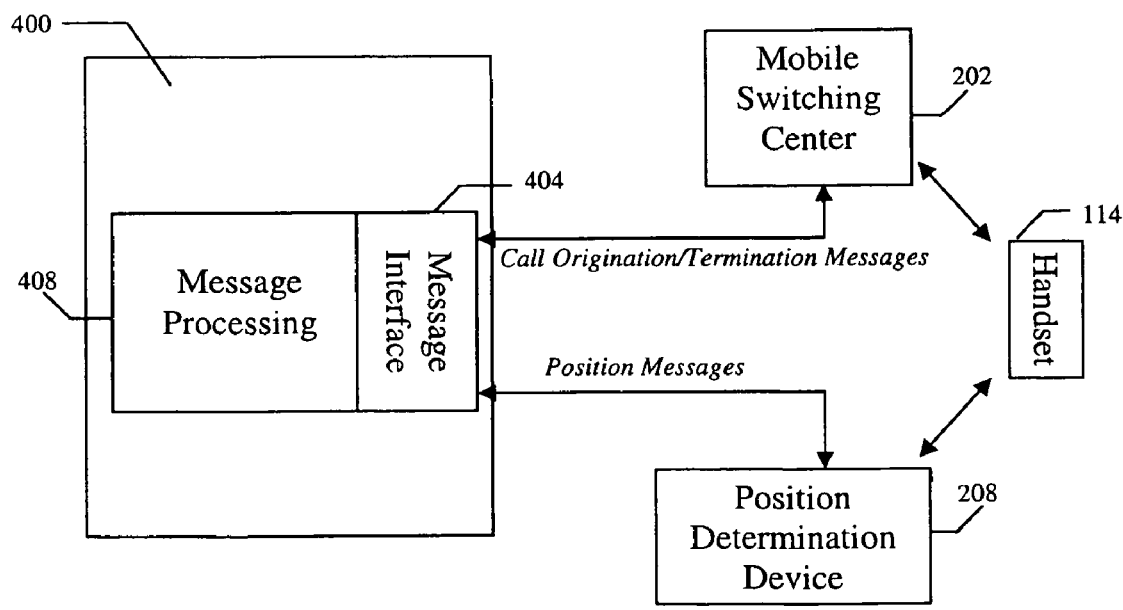
FIG. 5 is an exemplary block diagram of a system, according to Messaging Only embodiment.

For the Messaging Only method, as shown in FIG. 5, the NAC system 400 includes the Message Interface 404 and Message Processing engine 408. The Call Path Interface 402 and Call Processing engine 406 are not required in this embodiment. The Mobile Switching Center 202 sends a Call Origination Request message to the NAC system 400. Then the NAC system returns a Call Origination Response message to the Mobile Switching Center 202 on the same messaging interface so that the call can be forwarded to the wireline voice or data network. The NAC process is subsequently triggered. The NAC process may be stopped after generation of a sufficient amount of samples, or the process may continue until a Call Termination Request message is received from the Mobile Switching Center 202.

Figure 6:
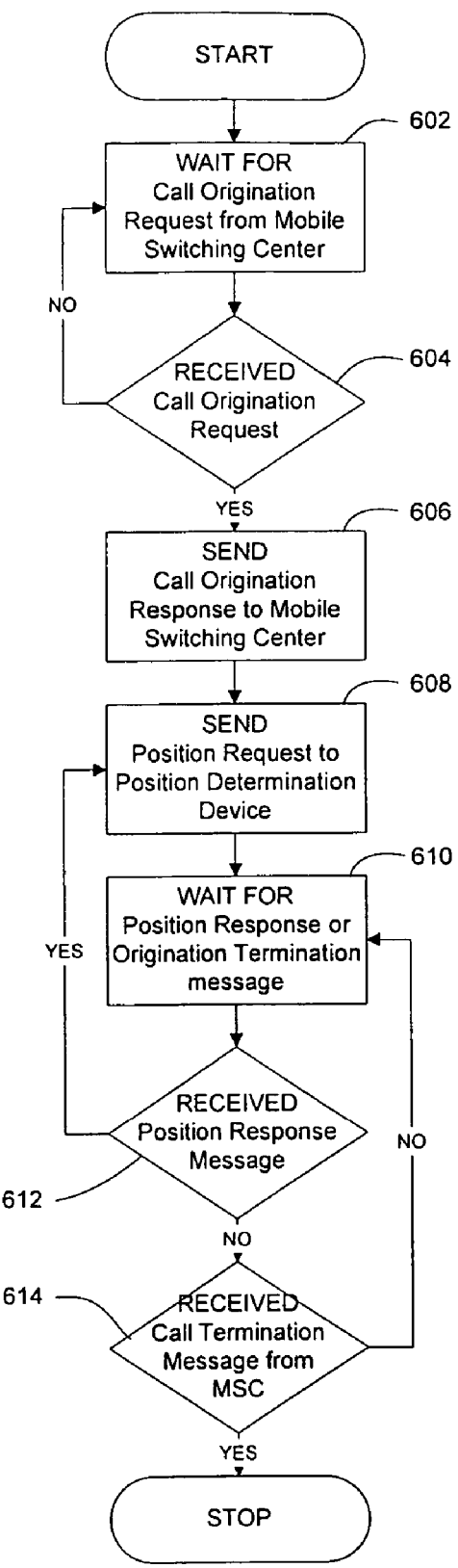
FIG. 6 is an exemplary process flow diagram, according to Messaging Only embodiment.

FIG. 6 presents a process flow chart based on the Messaging Only method. The process begins with block 602 where the NAC system 400 waits for a Call Origination Request message from the Mobile Switching Center 202. In block 604, the NAC system determines if a Call Origination Request has been received. If not, the process goes back to block 602 and waits. If the Call Origination Request has been received, in block 606, the NAC system 400 sends a Call Origination Response to the Mobile Switching Center 202 (so that the Mobile Switching Center can forward the call to its destination). Then in block 608, the NAC system 400 sends a Position Request to the Position Determination Device 208. This causes the Position Determine Device 208 to generate the necessary information and calculate the position of the handset 114 that placed the call.

Upon successful completion of position calculation, the Position Determination Device 208 sends a Position Response message back to the NAC system 400. In block 610, the NAC system waits for the Position Response message from the Position Determination Device 208 or a Call Termination request message from the Mobile Switching Center 202. After the NAC system 400 receives a Position Response message in block 612, the process goes back to block 608 and sends another Position Request. Finally, after the NAC system 400 receives a Call Termination Request message from the Mobile Switching Center 202 in block 614 indicating that the test is complete, the process stops.

Figure 7:
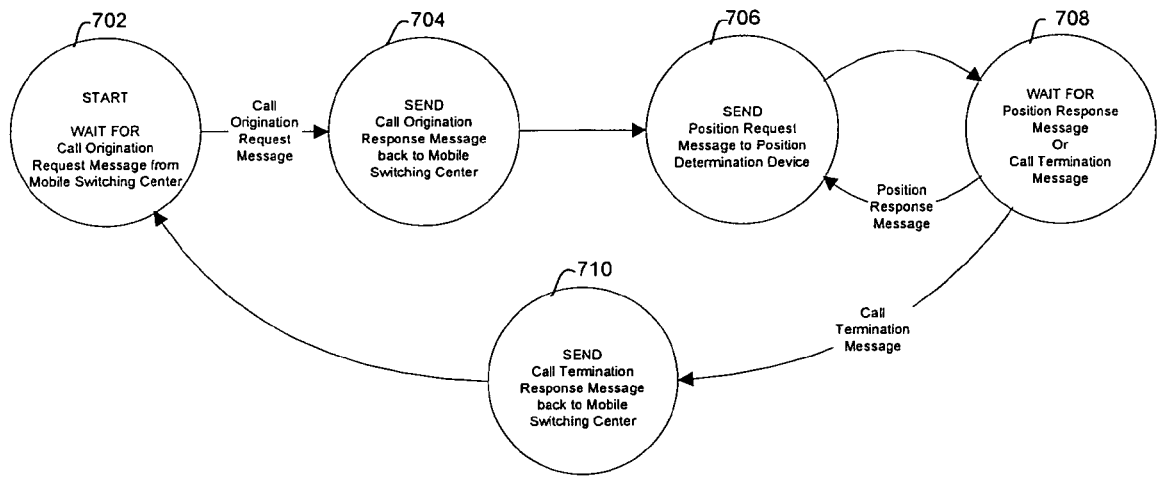
FIG. 7 is an exemplary state diagram, according to Messaging Only embodiment.

FIG. 7 presents the corresponding state machine. The start state 702 is to wait for a Call Origination Request message from the Mobile Switching Center 202. When a call is placed from a cellular handset 114, the Mobile Switching Center 202 sends a Call Origination Request message to the NAC system 400.

The next state 704 is to send a Call Origination Response message back to the Mobile Switching Center 202 for the call to be quickly forwarded to the destination. The next state 706 is to send a Position Request message to the Position Determination Device 208. This message causes the Position Determination Device 208 to calculate the position of the cellular handset 114 that placed the call.

The next state 708 is to wait for either a Position Response message from the Position Determination Device 208 or a Call Termination message from the Mobile Switching Center 202. A Position Response message is sent by the Position Determination Device 208 when it has finished calculating the position of the cellular handset 114 and contains the calculated position. If this message is received then go to state 706. Alternatively, a Call Termination Request message is sent by the Mobile Switching Center 202 when the call is terminated.

The final state 710 is to send a Call Termination Response message back to the Mobile Switching Center 202. This confirms that the activity associated with this call has been concluded. This is followed by a return to the start state 702.

Figure 8:
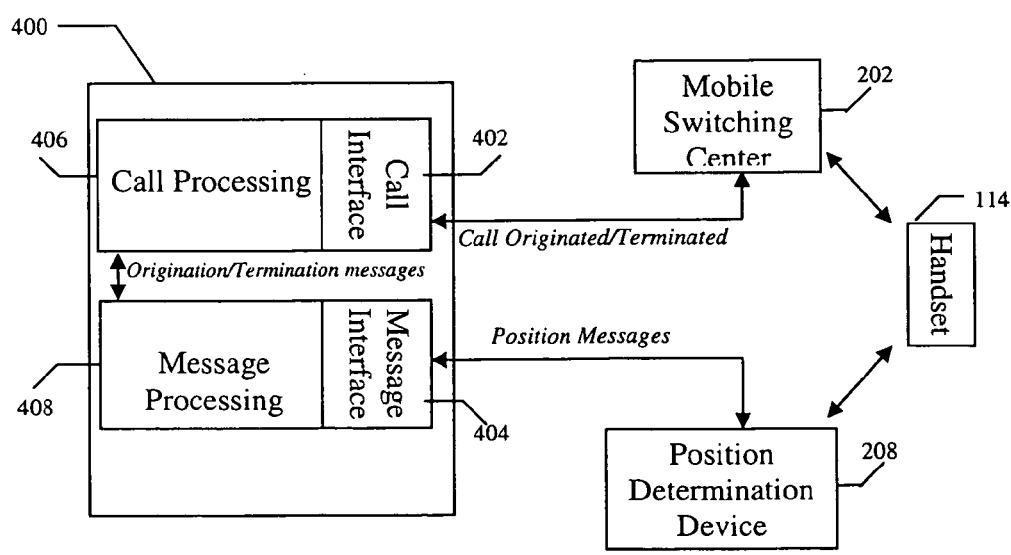
FIG. 8 is an exemplary block diagram of a system, according to Call Path embodiment.

For the Call Path method, as shown in FIG. 8, the NAC system 400 uses Call Path Interface 402 to communicate with the Mobile Switching Center 202, and uses Message Interface to communicate with the Position Determination Device 208. In this embodiment, a calibration call is made directly to the NAC system 400 from the Mobile Switching Center 202; it is received by the Call Processing Engine. The Call Processing engine 406 handles the received signal and sends a Call Origination message to the Messaging Processing engine, as is done between the MSC and the NAC system for the Messaging Only method. This triggers the NAC process. The NAC process may be stopped after generation of a sufficient amount of samples. Alternatively, the process may continue until the Call Processing engine 406 generates a Call Termination message to the Messaging Processing engine 408 as the call is released or terminated (the calibration call is ended by the tester)

Figure 9:
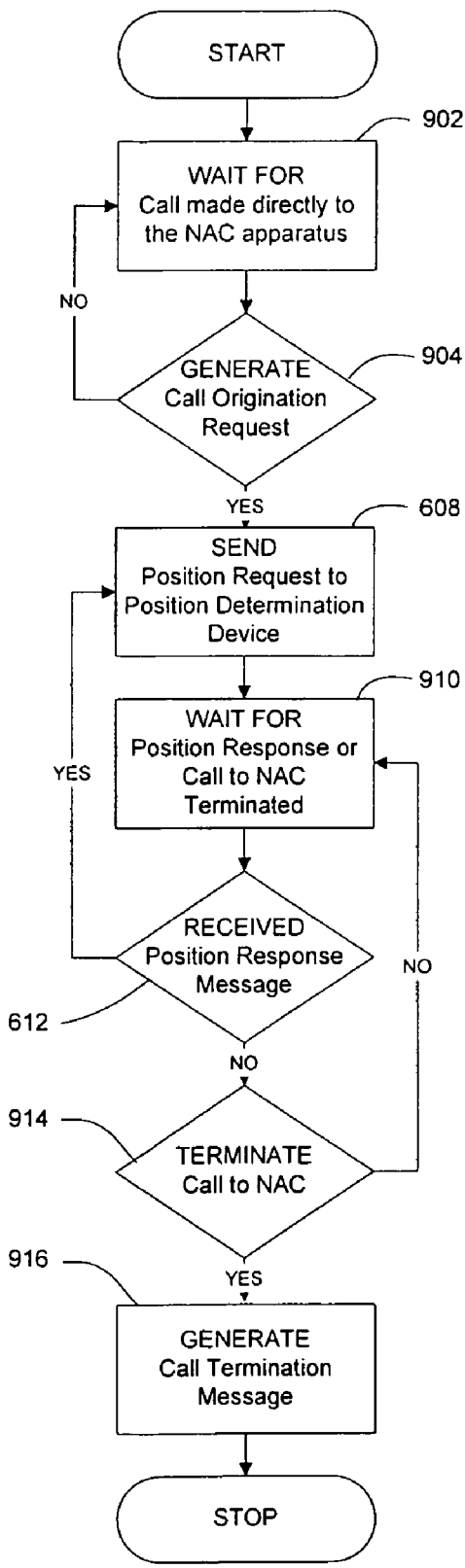
FIG. 9 is an exemplary process flow diagram, according to Call Path embodiment.

FIG. 9 presents a process flow chart based on the Call Path method. As shown, the process begins with block 902 where the NAC system 400 waits for a calibration call. Upon the receipt of a calibration call, the Call Processing engine 406 generates a Call Origination message within block 904. Then in block 608, the NAC system 400 sends a Position Request to the Position Determination Device 208. This causes the Position Determination Device 208 to gather the necessary information and calculate the position of the handset 114 that placed the call.

When the position calculation is successfully completed, the Position Determination Device 208 sends a Position Response message back to the NAC system 400. In block 910, the NAC system waits for the Position Response message from the Position Determination Device 208, or call termination or release of the Call Path Interface (indicating the calibration call is ended, whereby the Call Path corresponding to the calibration call is released by the Mobile Switching Center 202). In the latter case, the system monitors the call path from the MSC and determines when that call path is released by the MSC. After the NAC system 400 receives a Position Response message in block 612, the process goes back to block 608 and sends another Position Request. Block 914 checks if the call to NAC system is terminated. Upon the call termination in block 916, the Call Processing engine generates a Call Termination message to the Message Processing engine. This indicates that the test is completed and the process stops.

Figure 10:
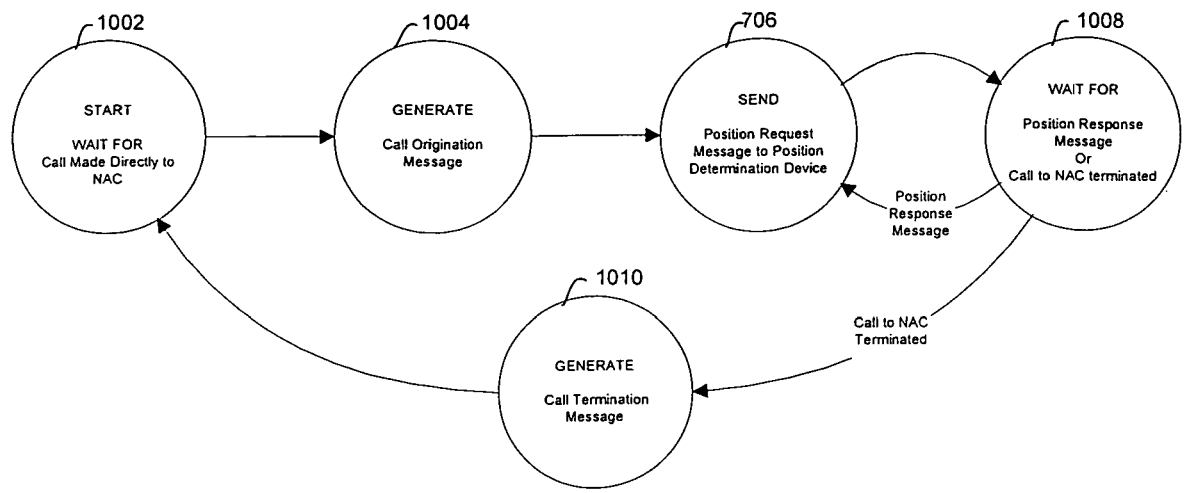
FIG. 10 is an exemplary state diagram, according to Call Path embodiment.

FIG. 10 presents the corresponding state machine. The start state 1002 is to wait for a calibration call forwarded from the Mobile Switching Center 202 to the NAC system 400. The next state 1004 is to process the received signal and generate a Call Origination message by the Call Processing engine 406. The Call Origination message is sent to the Messaging Processing Engine 408 via an internal interface, and this triggers the NAC process.

The next state 706 is to send a Position Request message to the Position Determination Device 208. This message causes the Position Determination Device 208 to calculate the position of the cellular handset 114 that placed the call. The next state 1008 is to wait for either a Position Response message from the Position Determination Device 208 or the Call to NAC terminated. A Position Response message is sent by the Position Determination Device 208 when it has finished calculating the position of the cellular handset 114 and contains the calculated position. When this message is received, then go to state 706. When, a call termination or release of the Call Path Interface occurs, then go to the final state 1010.

The final state 1010 is to generate a Call Termination message by the Call Processing engine 406 upon call termination. The Call Termination message is sent to the Message Processing engine 408 via an internal interface. This concludes the NAC process and the process returns to the start state 1002.

Figure 11:
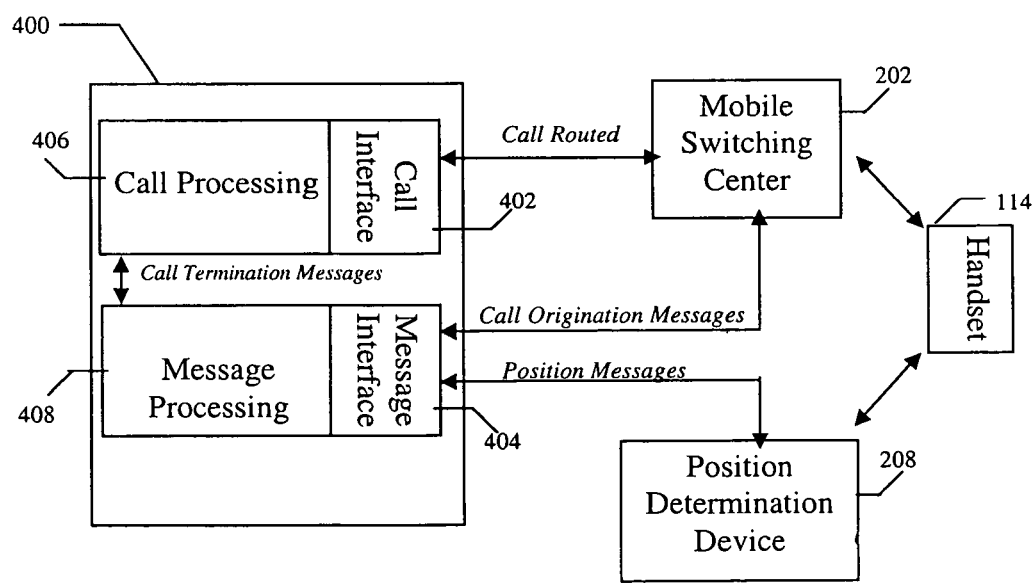
FIG. 11 is an exemplary block diagram of a system, according to Hybrid embodiment.

For the Hybrid method, as shown in FIG. 11, the NAC system 400 uses both the Call Path Interface 402 and the Message Interface 404 to communicate with the Mobile Switching Center 202, and also uses the Message Interface to communicate with the Position Determination Device 208. In this embodiment, when a call is placed from a handset 114 to the NAC system, the Mobile Switching Center 202 sends a Call Origination Request message to the NAC system 400. Then the NAC system returns a Call Origination Response message to the Mobile Switching Center, and this message contains information that causes the Mobile Switching Center to also route the call to the NAC system. The NAC process is subsequently triggered. The NAC process may be stopped after generation of a sufficient amount of samples, or the process may continue until the Call Processing engine 406 generates a Call Termination message to the Message Processing engine 408 as the call to NAC is released or terminated.

Figure 12:
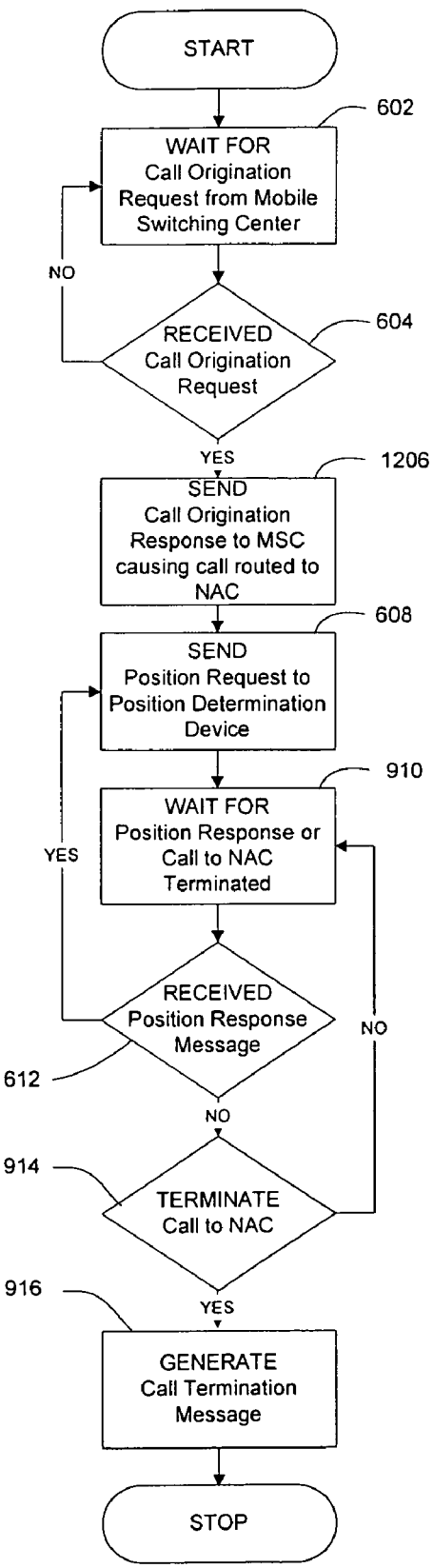
FIG. 12 is an exemplary process flow diagram, according to Hybrid embodiment.

FIG. 12 depicts a process flow chart based on the Hybrid method. The process begins with block 602 where the NAC system 400 waits for a Call Origination Request message from the Mobile Switching Center 202. In block 604, the NAC system determines if a Call Origination Request has been received. If not, the process goes back to block 602. If a Call Origination Request has been received, the process goes to block 1206 where the system sends a Call Origination Response to the Mobile Switching Center 202 (and this response message causes the Mobile Switching Center 202 to also forward the call to the NAC system's Call interface 402. Then in block 608, the NAC system 400 sends a Position Request to the Position Determination Device 208. This causes the Position Determination Device 208 to gather the necessary information and calculate the position of the handset 114 that placed the call.

When the position calculation is successfully completed, the Position Determination Device 208 sends a Position Response message back to the NAC system 400. In block 910, the NAC system waits for the Position Response message from the Position Determination Device 208, or call termination or release of the Call Path Interface from the Mobile Switching Center 202. After the NAC system 400 receives a Position Response message in block 612, the process goes back to block 608 and sends another Position Request. In Block 914, the process checks if the call to NAC is terminated. Upon call termination (the tester has ended the call, and the Call interface is released) in block 916, the Call Processing engine generates a Call Termination message to the Message Processing engine indicating that the test is complete, and the process stops.

FIG. 13 presents the corresponding state machine. As shown, the start state 702 is to wait for a Call Origination Request message from the Mobile Switching Center 202. When a call is placed from a cellular handset 114 to the NAC system 400, the Mobile Switching Center 202 sends a Call Origination Request message to the NAC system 400.

The next state 1304 is to send a Call Origination Response message back to the Mobile Switching Center 202. This response message contains the information that requires the Mobile Switching Center 202 to also route the call to the NAC system 400. The next state 706 is to send a Position Request message to the Position Determination Device 208. This message causes the Position Determination Device 208 to calculate the position of the cellular handset 114 that placed the call.

The next state 1008 is to wait for either a Position Response message from the Position Determination Device 208 or the call to NAC terminated. A Position Response message is sent by the Position Determination Device 208 when it has finished calculating the position of the cellular handset 114 and contains the calculated position. If this message is received then go to state 706. Alternatively, a call termination or release of the Call Path Interface leads to the final state 1010.

The final state 1010 is to generate a Call Termination message by the Call Processing engine 406 upon call to NAC termination. The Call Termination message is sent to the Message Processing engine 408 via an internal interface. This concludes the NAC process and the process returns to the start state 702.

The result of the NAC process is a log file generated by the Position Determination Device that contains a significant number of calibration samples generated over a certain time period, which is significantly more than the number of calibration samples that can be generated without a NAC system over the same time period. These calibration samples are used externally to the NAC system in order to determine the calibration values as described in the background of the invention. The key to generating significantly more calibration samples than is possible without NAC is the plurality of Position Request messages that is generated per call (the number of messages that can be generated per call is not bounded). Furthermore, the fact that the NAC process recognizes when each location is completed significantly reduces the time required to obtain a single sample, thus resulting in a significant time savings as compared to methods subject to uncertainty of processing time required by the Position Determination Device.

When the call path method or hybrid method embodiments described herein are used, the audible feedback mechanisms to the handset, and hence the tester, are also enabled via the triggers used to start the NAC process. In this case, the handset is provided with a synthesized speech generated by the NAC system, which entails notifying the tester of the progress of the NAC process. For example, the tester hears "sample 1 complete, calibration call location is <Latitude and Longitude of location of the calibration sample 1>; sample 2 complete calibration call location is <Latitude and Longitude of location of the calibration sample 2>; etc. This audible feedback mechanism continues throughout the duration of the calibration call. The location associated with a calibration sample is generated from the log file, which is output from the NAC system. An example of this log file is shown in FIG. 14.

In one embodiment, the log file is generated from the Position Request and Position Response messages. The Position Request Message contains a telephone number that identifies the handset that made the calibration call, which is used by the Position Determination Device 208 to locate the correct handset. The Position Response Message sent in response to the Position Request message contains the latitude and longitude of the handset for that calibration sample. This facilitates synthesizing the speech that provides the audible feedback to the handset/tester. A log file entry is created for each handset used to make calibration calls.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for calibrating a wireless network including a position determination device (PDD), the method comprising:
 receiving a voice or data calibration call;
 establishing a loop process responsive to the voice or data calibration call;
 generating and sending a plurality of position request messages to the PDD within the loop process;
 receiving a plurality of position request responses from the PDD in response to the plurality of position request messages, within the loop process;
 receiving a termination trigger;
 terminating the loop process and the generating and sending of the plurality of subsequent position request messages when the termination trigger is received; and
 sending a termination message in response to the received termination trigger.

2. The method of claim 1, further comprising generating output data for use in network calibration.

3. The method of claim 1, wherein the termination trigger is a voice or data call termination message from a mobile switching center.

4. The method of claim 1, wherein the termination trigger is release of a phone call.

5. The method of claim 1, further comprising generating a feedback signal.

6. The method of claim 1, further comprising:
 receiving a voice or data call;
 sending a first position request message to the PDD in response to the received voice or data call;
 receiving a position response message from the PDD; and
 sending a second position request message to the PDD in response to the same received voice or data call and the received position response message.

7. A system for calibrating a wireless network including a Position Determination Device (PDD) comprising:
 means for receiving a voice or data calibration call;
 means for establishing a loop process responsive to the voice or data calibration call;
 means for generating and sending a plurality of position request messages to the PDD within the loop process;
 means for receiving a plurality of position request responses from the PDD within the loop process;
 means for receiving a termination trigger;
 means for terminating the loop process and the generating and sending of the plurality of subsequent position request messages when the termination trigger is received; and
 means for sending a termination message in response to the received termination trigger.

8. The system of claim 7, further comprising means for generating output data for use in network calibration.

9. The system of claim 7, wherein the termination trigger is a voice or data call termination message from a mobile switching center.

10. The system of claim 7, wherein the termination trigger is release of a phone call.

11. The method of claim 7, further comprising generating a feedback signal.

12. The system of claim 7, further comprising:
 means for receiving a voice or data call;
 means for sending a first position request message to the PDD in response to the received voice or data call;
 means for receiving a position response message from the PDD; and
 means for sending a second position request message to the PDD in response to the same received voice or data call and the received position response message.

13. A method for calibrating a wireless network including a position determination device (PDD), the method comprising:
 establishing a loop process responsive to a voice or data calibration call;
 generating and sending a plurality of position request messages to the PDD within the loop process;
 receiving a plurality of position request responses from the PDD within the loop process;
 generating a calibration sample as a difference between an absolute time reference and an actual time reference for each received position request response; and
 aggregating the calibration samples for the plurality of received position request responses to generate a calibration value.

14. The method of claim 13, further comprising generating a termination trigger to terminate the generation and sending of the plurality of position request messages.

15. The method of claim 14, wherein the termination trigger is a voice or data call termination message from a mobile switching center.

16. The method of claim 14, wherein the termination trigger is release of a phone call.

17. The method of claim 13, further comprising generating a feedback signal.

18. The method of claim 13, further comprising:
 receiving a voice or data call;
 sending a first position request message to the PDD in response to the received voice or data call;
 receiving a position response message from the PDD; and
 sending a second position request message to the PDD in response to the same received voice or data call and the received position response message.

* * * * *